United States Patent Office
3,446,296
Patented May 27, 1969

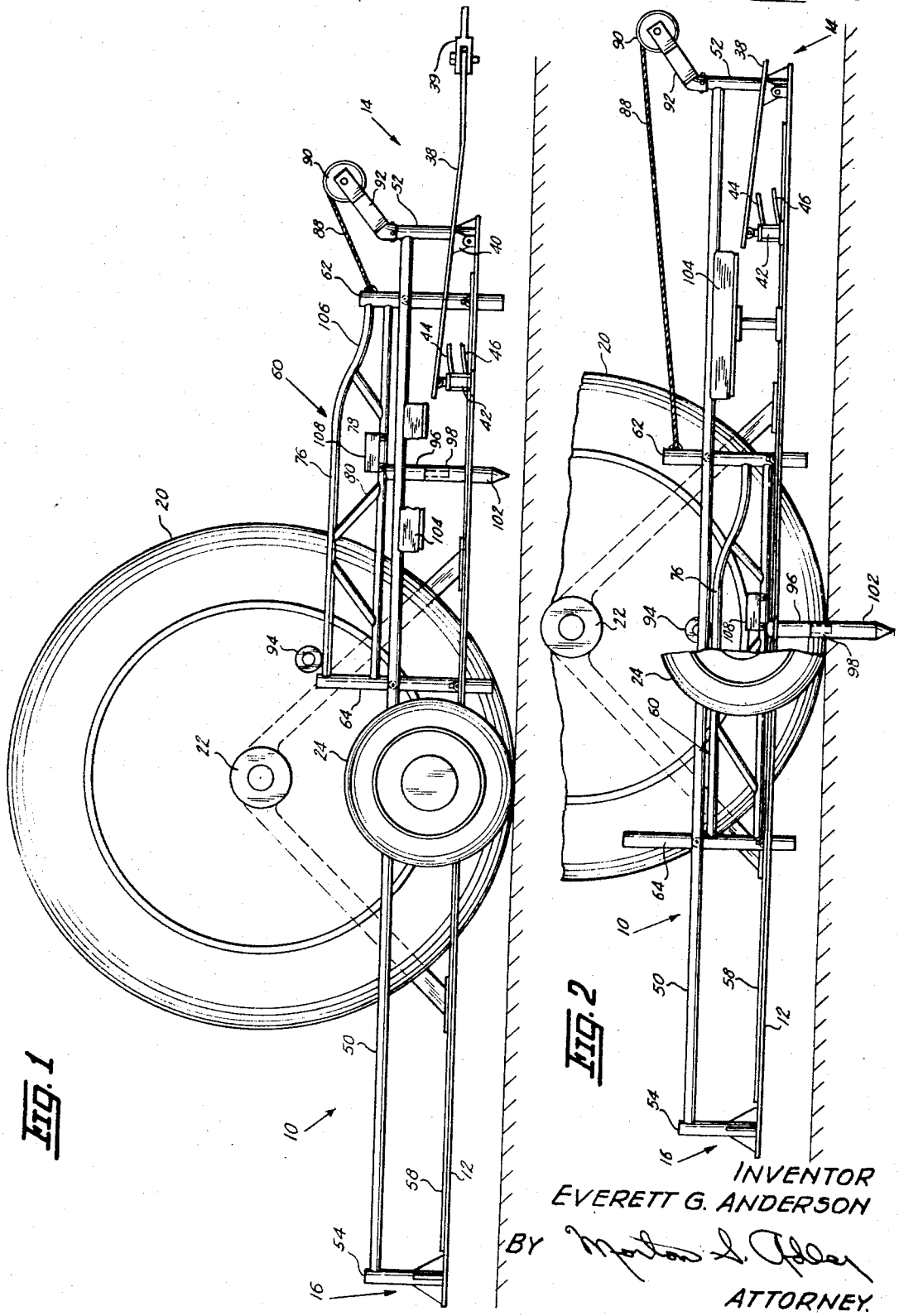

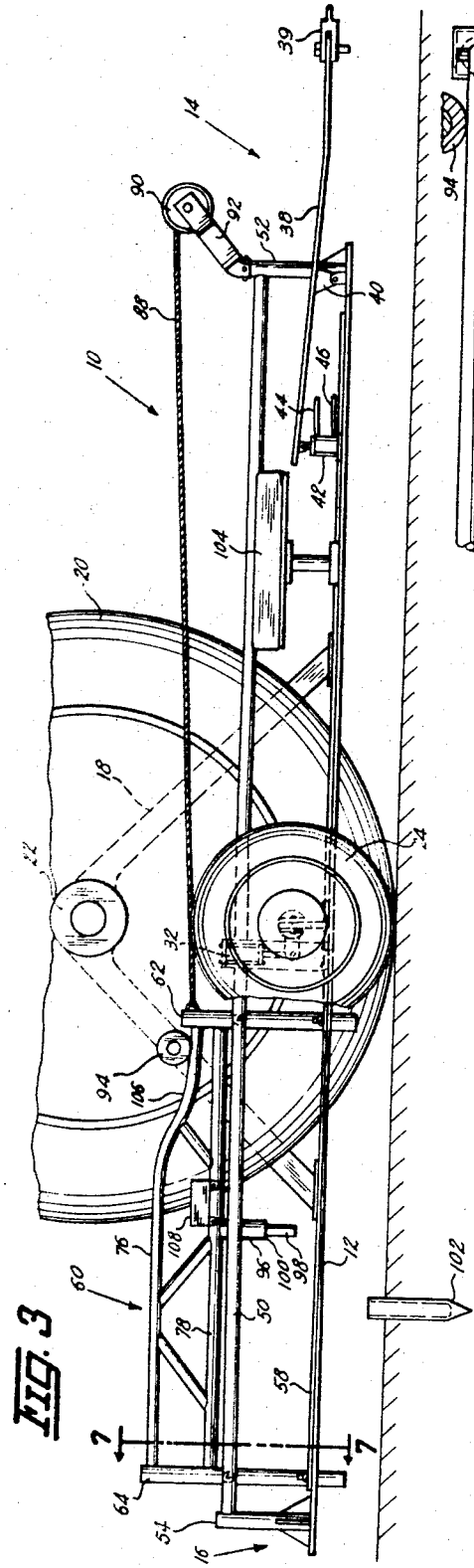

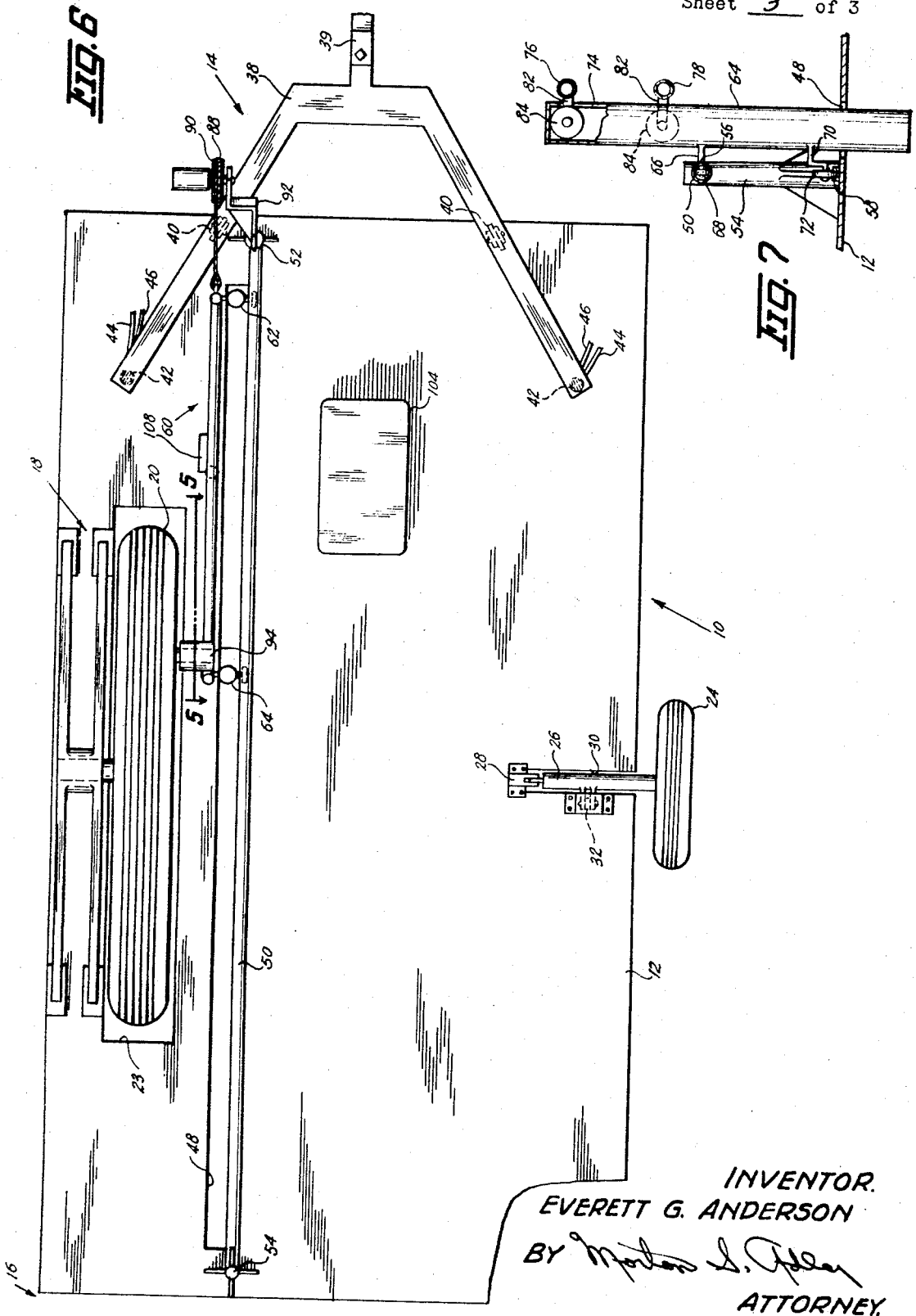

3,446,296
FENCEPOST DRIVING APPARATUS
Everett G. Anderson, 2311 S. Lemon St.,
Sioux City, Iowa 51106
Filed Feb. 26, 1968, Ser. No. 708,262
Int. Cl. E21b 11/02, 7/00; E21c 1/00
U.S. Cl. 175—19                                    10 Claims

ABSTRACT OF THE DISCLOSURE

Apparatus to facilitate erecting a line of fence posts. Utilizes a flatbed trailer to be pulled by a tractor or the like; the trailer having one small wheel, adjustable for leveling purposes, and a large wheel carrying an eccentric boss, which, during rotation of the wheel in the forward movement of the trailer, engages and vertically moves a frame that in turn imbeds a post receiving standard in the ground. The frame is longitudinally movable relative to the trailer bed so that it will remain in the same vertical plane relative to the ground during its downward movement and while the trailer is moving forwardly and is designed to engage a manually positioned hollow fence post standard which is driven into the ground by the downward movement of such frame. The trailer bed is designed to carry personnel who will manually mount fence posts in each standard.

BACKGROUND OF THE INVENTION

Field of the invention

This invention relates to trailer drawn apparatus, assisted partially by certain manual operations, for quickly driving into the ground at designated spaced intervals, a hollow fence post standard into which a fence post can be manually inserted as the standards are located.

The trailer used is designed to carry personnel and a supply of fence post and standards and one of the important features of this invention is the fact that its operating mechanism does not require close tolerances and therefore may be manufactured very economically and will operate efficiently with a minimum of maintenance.

Description of the prior art

A general type of machine with which this invention is involved is exemplified in Patent 2,776,110. Such prior device, however, is quite different from the present invention in that it utilizes a good deal of automatic equipment and is designed for positioning of the actual fence posts. The present invention, being concerned with only driving a relatively short fence post standard and utilizing manual operations for aligning the standards with the driving mechanism and for inserting the post into the standards, results in a considerable more simplified device than appears in the prior art and is accordingly considerably more economical to manufacture.

SUMMARY

The present invention utilizes a flatbed trailer having two opposed wheels of unequal size and designed to be pulled by a tractor. The smaller of the wheels is adjustable for leveling the trailer and the larger of the wheels is provided with an eccentric boss which, in the normal rotation of said wheel, will act against a driving frame to drive a fence post standard into the ground. Personnel are intended to ride on the trailer and will not only manually position the standards relative to the driving frame but will also insert the fence posts into the standards once they have been driven into the ground. The driving frame is longitudinally slidable relative to the platform so that during the period which it is engaged by the boss on the large wheel, such frame will remain in same vertical plane relative to the ground as the trailer moves forwardly.

The driving frame is spring-loaded in both horizontal and vertical directions so that as the boss on the large wheel moves out of engagement with the driving frame in the normal rotation of said wheel, such frame is moved horizontally to its initial position on the trailer bed and also is elevated prior to its operation in driving the succeeding standard.

BRIEF DESCRIPTION OF THE DRAWING

FIG. 1 is a side elevational view of this post driving apparatus showing the position of the driving frame in contact with a post standard about to be driven into the ground, FIG. 2 is a side elevational view similar to FIG. 1 and showing the position of the driving frame when the post standard has been driven into the ground, FIG. 3 is a view similar to FIGS. 1 and 2 showing the driving frame out of engagement with the post standard and ready to be returned to its original position, FIG. 4 is a front view taken from the line 4—4 of FIG. 1, FIG. 5 is an elevational view, partly in section, taken from the line 5—5 of FIG. 6, FIG. 6 is a top plan view of this apparatus, and FIG. 7 is an elevational view, partly cut away, taken from the line 7—7 of FIG. 3.

DESCRIPTION OF PREFERRED EMBODIMENT

Referring to the drawings, a wheeled trailer is designated generally by the numeral 10 and is designed to be pulled by a prime mover (not shown). Trailer 10 includes a generally rectangular platform or flatbed 12 having the forward end 14 and the rearward end 16. At approximately the longitudinal center of one side edge of the flatbed 12, here shown as the left side in the direction of forward movement, an A-frame 18 is mounted and a relatively large tired ground engaging wheel 20 is attached to the apex of frame 18 by a suitable bearing 22 so as to extend through the elongated opening 23 in member 12 as best seen in FIG. 6. Oppositely disposed to wheel 20 at the other side of platform 12 is the relatively small tired wheel 24, which, as best seen in FIG. 4, is mounted to an axle 26 that in turn is pivotally attached to a mounting member 28 securely affixed to platform 12. Axle 26 is disposed parallel to and slightly above the top surface of platform 12 and is in registration with slot 30 in said platform as best seen in FIG. 6. A two way hydraulic jack 32 is mounted to platform 12 adjacent shaft 26 and is connected to said shaft for selectively moving the same upwardly and downwardly for purposes of leveling platform 12 as may be necessary. Jack 32 includes the hydraulic hoses 34 and 36 which are designed to be connected to the hydraulic system of a prime mover in a well-known manner. At the forward end of the platform or trailer bed 12, there is a forwardly extending A-frame 38 to which suitable hitch means 39 from a prime mover (not shown) may be attached. The arms of frame 38, as seen in FIGS. 1 and 3 are pivotally attached as at 40 to the forward edge portion of platform 12 and the extremities of frame 38 are secured respectively to hydraulic jacks 42 mounted on platform 12 as shown. Such jacks 42 have the necessary hydraulic hoses 44 and 46 for attachment to the hydraulic power from a prime mover. The purpose of jacks 42 is to provide other selective means for maintaining the flatbed 12 on a level plane.

On the inner side of wheel 20, platform 12 is provided with a elongated longitudinal slot 48 extending substantially between platform ends 14 and 16, and adjacent the inner edge of said slot is the elevated guide rail 50 supported at respective ends by the posts 52 and 54. Rail 50 is preferably tubular and on the side opposite wheel 20, such rail is provided with the elongated slot 56 which is substantially co-extensive with the length of said rail (FIG. 5). Below rail 50 and in vertical alignment therewith is a track member 58 secured to platform 12 as seen in FIG. 7.

A driving frame assembly designated generally by the numeral 60 is designed to move horizontally relative to rail 50 and track 58 and also includes components to move vertically and to accomplish these purposes, it is constructed as follows. The ends of frame assembly 60 are defined by the vertically disposed, spaced and similarly constructed hollow posts 62 and 64 and one of said posts is shown in more detail in FIG. 7 so that a description of one will suffice for both. Such posts include a perpendicularly projecting small arm 66 extending into slot 56 of rail 50 and carries a roller member 68 that will ride within the confines of rail 50 which serves as a track or guide means therefor. Below arm 64, said posts carry a bracket member 70 having the wheel 72 for tracking engagement with the track 58.

Each post 62 and 64 is provided with the respective vertical slot 74 as seen in FIG. 7 and a vertical movable sub-frame structure comprising the vertically spaced rods or rails 76 and 78 secured together by the cross braces 80 are mounted to posts 62 and 64 as seen best in FIG. 7. Such mounting includes the stub arms 82 which extend into slot 74 and carry the roller members 84 which are vertical movable in said posts in a well known manner. Posts 62 and 64 are spring-loaded as at 86 (FIG. 5) so that rods 76 and 78 are normally urged to their elevated position. The lower end of posts 62 and 64 will extend into slot 56 in platform 12 as shown. Thus far described, it will be appreciated that frame structure 60 is movable horizontally relative to rail 50 and track 58 and that the sub frame consisting of rail 76 and 78 are vertically movable relative to posts 62 and 64.

At the forward end of platform 12, a suitable cord or cable 88 on a spring loaded reel 90 is mounted to a suitable support 92. Cable is attached to the forward side of post 62 for the purpose of returning frame 60 from its position shown in FIG. 3 to its position shown in FIG. 1 as will later be referred to in more detail.

On the disc portion of wheel 20 there is eccentrically mounted a rotatable cam in the form of a boss or projection 94 that is designed to engage rod 76 of frame assembly 60 for limited period of time during the rotation of wheel 20 and will be described in the operation of this apparatus.

Extending from rod 78 at approximately the center between posts 62 and 64 as seen in FIG. 3, is the rod-like projection 96 having a concentrically reduced depending portion 96 to define the shoulder 100. These parts serve to position and guide a hollow fence post standard 102 which is pointed at one end to facilitate its penetration into the ground. Such standard is designed to be manually placed over shank portion 96 as to abut the shoulder 100 as seen in FIG. 1.

OPERATION

In the use of this apparatus as described, certain manual operations are utilized to eliminate unnecessary mechanical structure and the costs thereof and for this purpose the platform 12 is adapted to carry personnel as well as a supply of fence posts (not shown) and a supply of post standards 102. Preferably, a seat 104 is mounted on platform 12 for use by working personnel as desired.

It will be understood that this trailer unit 12 will be hitched to and pulled by a suitable prime mover such as a tractor or the like and the flatbed or platform 12 can be leveled by hydraulic means 32 and 42 as necessary and as previously described. The initial or starting position of frame assembly 60 is shown in FIG. 1 which places it near the forward end 14 of trailer 10 and in this position, it will be noted that rail 76 and 78 of frame assembly 60 are in their uppermost or elevated positions.

The seat 104 which is located on platform 12 relative to the approximate center of frame assembly 60 when it is toward the front 14 as shown in FIG. 1 and personnel occupying said seat will manually engage one of the post standards 102 with elements 98 and 100 on rod 78 so that such standard 102 will be in the position shown in FIG. 1. When this has been done, and as the trailer moves forwardly, the rotation of wheel 20 will bring the cam 94 into engagement with rod 76 and as wheel 20 continues to rotate forwardly, the arcuate downward path of cam 94 will cause it to roll along rail 76 so that rails 76 and 78 will move downwardly in relation to posts 62 and 64. As this occurs, it will be appreciated that standard 102 will be driven into the ground. A vibrator 108 of any suitable type, such as electrical or gasoline powered, is mounted on the vertically reciprocal rail means of assembly 60 and may be manually actuated, if needed, to facilitate the driving of standard 102 in a well known manner.

During the time that cam 94 is in engagement with rail 76, the force exerted against frame assembly 60 will result in such assembly remaining stationary relative to the ground while trailer 10 moves forwardly. During this time, rail 50 and track 58 will move relative to posts 62 and 64 as previously described. The sequence and steps in the action of cam 94 against rod 76 in the operation described is shown progressively in FIGS. 1, 2, and 3. In this regard, it will be noted that the forward end portion of rod 76 is provided with a downward arcuate incline 106 so that as cam 94 reaches the position in FIG. 2, which is the lowermost position for rod 76, the continued rotation of wheel 20 will permit frame assembly 60 to commence its ascent as the curved portion 106 comes into registration with cam 94. Thus, by the time cam 94 is moving upwardly so as to leave engagement with rod 76, frame assembly 60 has returned to its elevated position due to springs 86 and, because of the spring-loaded cable 88, frame assembly 60 will be automatically returned to the position shown in FIG. 1, where the operation just described is repeated. From the foregoing, it will be appreciated that as the standards 102 are driven into the ground, a fence post, preferably in the form of a pipe (not shown) can be easily telescopically inserted into such standard by personnel carried on platform 12.

In using this invention, a line of fence posts can be quickly and easily set up with a minimum of expense. The construction of this apparatus 10 is such that no close tolerances are required so that expenses of repairs and maintenance are kept to a minimum. The use of some manual operations eliminate the necessity for complicated and intricate working machinery and at the same time provides sufficient mechanical apparatus wherein the manual operations utilized are not complicated. Accordingly, from the foregoing, it is thought a full understanding of the construction and operation of this invention will be had and the advantages of the same will be appreciated.

It will be understood that the phraseology employed herein is for the purpose of description and not for limitation and that modification and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. A fence post driving apparatus comprising:
   an elongated wheeled flatbed trailer having a front and rear end and adapted to be pulled by a prime mover,
   a vertically disposed frame,
   means mounting said frame to said trailer for reciprocal movement intermediate said front and rear end,
   rail means mounted to said frame for vertical reciprocal movement relative thereto,
   cam means carried by one of the trailer wheels for engaging said rail means for a limited time during the rotation of said wheel in the forward travel of said trailer to effect a downward movement of said rail means, a hollow post standard adapted to receive and support a fence post, and means on said rail means for engaging said standard so as to drive it into the ground upon the downward movement of said rail means.

2. A device as defined in claim 1 including:

said frame having a starting position near said front end defining the starting position of the downward movement of said rail means, the downward movement of said rail means causing said frame to remain stationary relative to the ground whereby forward movement of said trailer moves said flatbed relative to said frame to position said frame near said rear end, and means on said trailer connected to said frame to automatically return it from said rear end to its starting position.

3. A device as defined in claim 2 wherein said rail means is spring-loaded to normally urge it to its uppermost position and to return it to said position when said frame is near said rear end.

4. A device as defined in claim 1 including means adjustably mounting at least one wheel to said trailer to serve as a leveling means for said flatbed.

5. A device as defined in claim 1 including a vibrator means carried by said rail means.

6. A fence post driving apparatus comprising:

an elongated wheeled flatbed trailer having a front and rear end and adapted to be pulled by a prime mover, longitudinal frame guide means carried by said flatbed and closely adjacent one of said wheels, a vertically disposed frame, means movable mounting said frame to said guide means intermediate said front and rear ends, rail means mounted to said frame for vertical reciprocal movement relative thereto, means eccentrically mounted on the wheel closest to said guide means for engaging said rail means for a limited time during the rotation of said wheel in the forward travel of said trailer to effect a downward movement of said rail means, a hollow post standard adapted to be driven into the ground and to telescopically receive and support a fence post, means on said rail means for engaging said standard so as to drive it into the ground upon the downward movement of said rail means, and the forward movement of said trailer resulting in said eccentrically mounted means moving out of engagement with said rail means.

7. A device as defined in claim 6 wherein:

said frame is normally disposed near said front end, the engagement of said rail means to effect its downward movement causing said frame to remain stationary relative to the ground as said trailer is pulled forwardly so that said rear end moves toward said frame, and spring-loaded means carried by said trailer and attached to said frame to return said frame to said front end when said rail means is free of engagement for moving it downwardly.

8. A device as defined in claim 6 wherein:

said rail means is normally disposed in its elevated position, and spring-loaded means on said frame for returning said rail means to its elevated position when it is free of engagement for a downward movement.

9. A device as defined in claim 6 including means adjustable mounting one of said wheels to said trailer to serve as a leveling means for said flatbed.

10. A device as defined in claim 6 wherein the wheel having means for engaging said rail means is substantially larger than any other wheel on said trailer.

References Cited

UNITED STATES PATENTS

| | | | |
|---|---|---|---|
| 886,376 | 5/1908 | Landholm | 173—45 |
| 1,482,396 | 2/1924 | Hansen | 173—45 |
| 2,135,970 | 11/1938 | Dukelow | 175—19 |
| 2,154,732 | 4/1939 | Dahl | 175—19 |
| 2,576,467 | 11/1951 | Lukens | 173—45 X |
| 2,655,006 | 10/1953 | Hoen | 175—19 |
| 2,660,035 | 11/1953 | Zeiser | 175—19 X |
| 2,660,403 | 11/1953 | Roland | 175—19 |
| 3,352,369 | 11/1967 | Bodine | 175—19 X |

NILE C. BYERS, Jr., *Primary Examiner.*

U.S. Cl. X.R.

173—45; 175—108